Jan. 11, 1927.　　　　　　　　　　　　　　　　　1,613,668
J. J. MASCUCH
AUTOMOBILE BUMPER AND CLAMP
Filed April 26, 1926
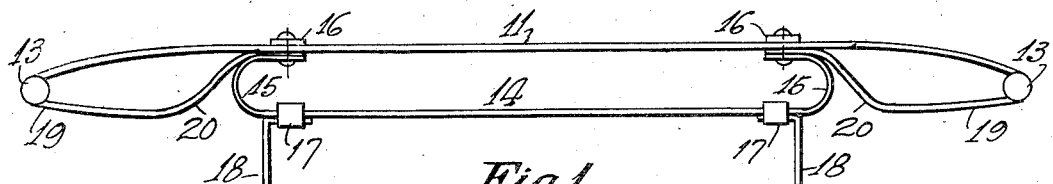
Fig. 1
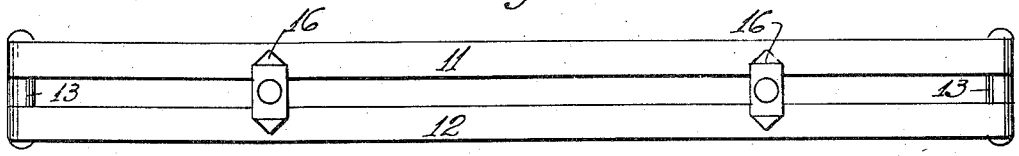
Fig. 2
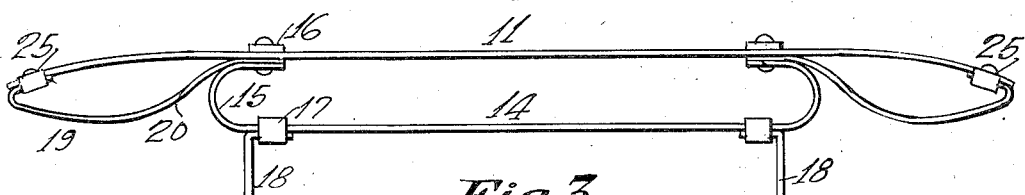
Fig. 3
Fig. 4
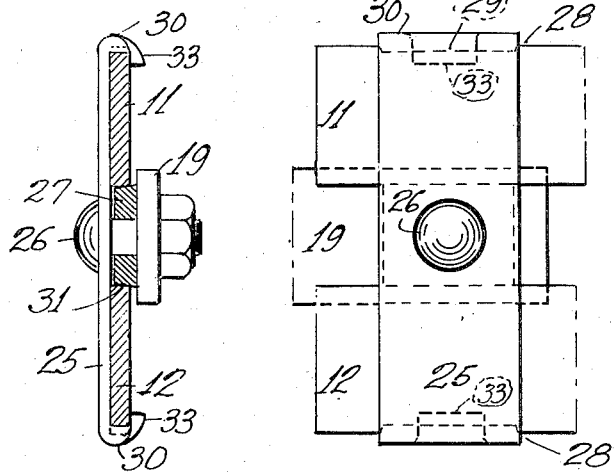
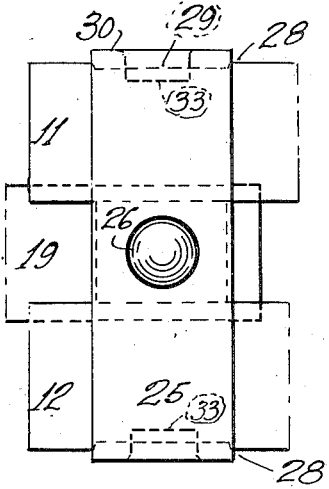
Fig. 5　　　Fig. 6
INVENTOR.
Joseph J. Mascuch
BY
M. H. Loughridge
ATTORNEY Patented Jan. 11, 1927.

1,613,668

UNITED STATES PATENT OFFICE.

JOSEPH J. MASCUCH, OF EAST ORANGE, NEW JERSEY.

AUTOMOBILE BUMPER AND CLAMP.

Application filed April 26, 1926. Serial No. 104,780.

This invention relates to automobile bumpers and to the clamps used in connection therewith and has for an object to improve the end of the impact member of the bumper so that it will not catch on obstacles when the vehicle backs up; another object of the invention is an improved clamp whereby the impact members of the bumper can be assembled in straight lengths thereby reducing the cost of labor and material in manufacture. Other objects of the invention will appear from the following specification and the accompanying drawings, in which, Fig. 1, is a plan view of one form of my invention, Fig. 2 is an elevation from the impact side of the bumper shown in Fig. 1, Fig. 3 is a plan view of a modified form of my invention, Fig. 4 is a detail of one of the parts, Fig. 5 is a sectional view of the clamp for flat bars and Fig. 6 is an elevation of my improved clamp.

In the manufacture of the popular types of automobile bumpers a pair of parallel bars are usually placed in front to receive the impact and a rear bar is provided to support the impact members and to receive the attaching brackets. The rear bar is shorter than the impact bars so that the latter project beyond the rear bar and if curved rearwardly these ends are liable to hook upon objects as the car moves backwards. In the present invention a member is linked to the end of the impact members which turns inwardly and forms a loop at the projecting ends of the impact members so that the open hook construction is avoided and the ends of the impact members are reinforced.

Where parallel impact bars are used they are usually secured together by means of eyes in the ends which are connected by end posts. Some advantage arises in the manufacture of these bars if the eyes can be eliminated and the bars retain their flat shape throughout. The present invention embodies a clamp for this purpose with means for taking up lost motion arising in the clamp. This clamp is assembled by one bolt.

Referring to the drawings, 11 and 12 are the impact bars, which, in Fig. 1, are held in vertical parallel relation by the end posts 13. The rear bar is indicated by 14 which is looped at the ends at 15 and clamped to the impact bars at 16. The supporting brackets 18 are secured to the rear bar at 17. The loop member 19, Fig. 4, is secured to the end post 13 by the eye 21 and has an inward off-set at 20 where the end aligns with the impact bars and is clamped in place by the clamp 16. It will be observed from Fig. 1 that this forms a closed loop on the end of the impact bars which slopes on both sides towards the point and thus prevents the ends of the impact bars hooking on objects, at the same time these ends are considerably reinforced by this loop construction.

The general construction in Fig. 3 is similar to Fig. 1 except that the end posts are omitted and the clamps 25 are used instead of the end posts. These clamps are constructed as shown in Figs. 5 and 6. The clamping plate 25 is turned over at the ends 30 to engage the edges of the impact bars 11 and 12 while the wedge piece 27 with tapered edges at 31 by the action of the bolt 26 forces the impact bars apart and under the ledges 33 of the plate 25. Lost motion in this connection is easily taken up by the bolt 26 increasing the pressure on wedge 27. The back bar 19 of the loop is clamped against the wedge 27 as shown.

The impact bars are preferably notched as indicated by the dotted line 29, Fig. 6, to prevent longitudinal movement of these bars in the clamp. This notch may be tapered on the edges as indicated at 28 to insure a tight fit between the clamp and the impact bars. With this arrangement the impact bars are manufactured in substantially straight lengths and can be polished on a series of rollers automatically operated. The bumper can be packed in smaller compass and can readily be assembled.

Having thus described my invention, I claim:

1. In an automobile bumper, the combination of an impact member, a rear supporting bar spaced from and connected with said impact member intermediate its ends and a member forming a loop with the end of said impact member and having its free end bent inwardly to clamp against said impact member.

2. In an automobile bumper, the combination of an impact member, a rear supporting bar spaced from and connected with said impact member intermediate its ends and a loop member connected with the end of said impact member with its free end bent inwardly and clamped between the end of the rear bar and the impact member.

3. In an automobile bumper, the combination of a pair of impact members, a rear supporting bar spaced from and connected with said impact members intermediate their ends and a loop member connected between the impact members at their end and bent to form a closed loop with the impact members at the bumper end, the inner end of said loop member being clamped to said impact members.

4. In an automobile bumper clamp, the combination of a pair of impact members placed vertically in parallel relation, a clamping plate engaging the outer edges of said impact members with a taper engagement and a wedge and bolt for forcing said members into engagement with said clamping plate.

5. In an automobile bumper clamp, the combination of a pair of impact members placed vertically in parallel relation, notches in the outer edges of said impact members, a clamping plate engaging said notches and a wedge and bolt for forcing said members into engagement with said notches.

6. In an automobile bumper clamp, the combination of a pair of impact members placed in parallel relation and spaced from each other, a clamping plate passing across said members and engaging a tapered notch in the outer edges of said members, a wedge between said members and a bolt clamping said plate and wedge in position.

In testimony whereof I affix my signature.

JOSEPH J. MASCUCH.